United States Patent Office 2,991,506
Patented July 11, 1961

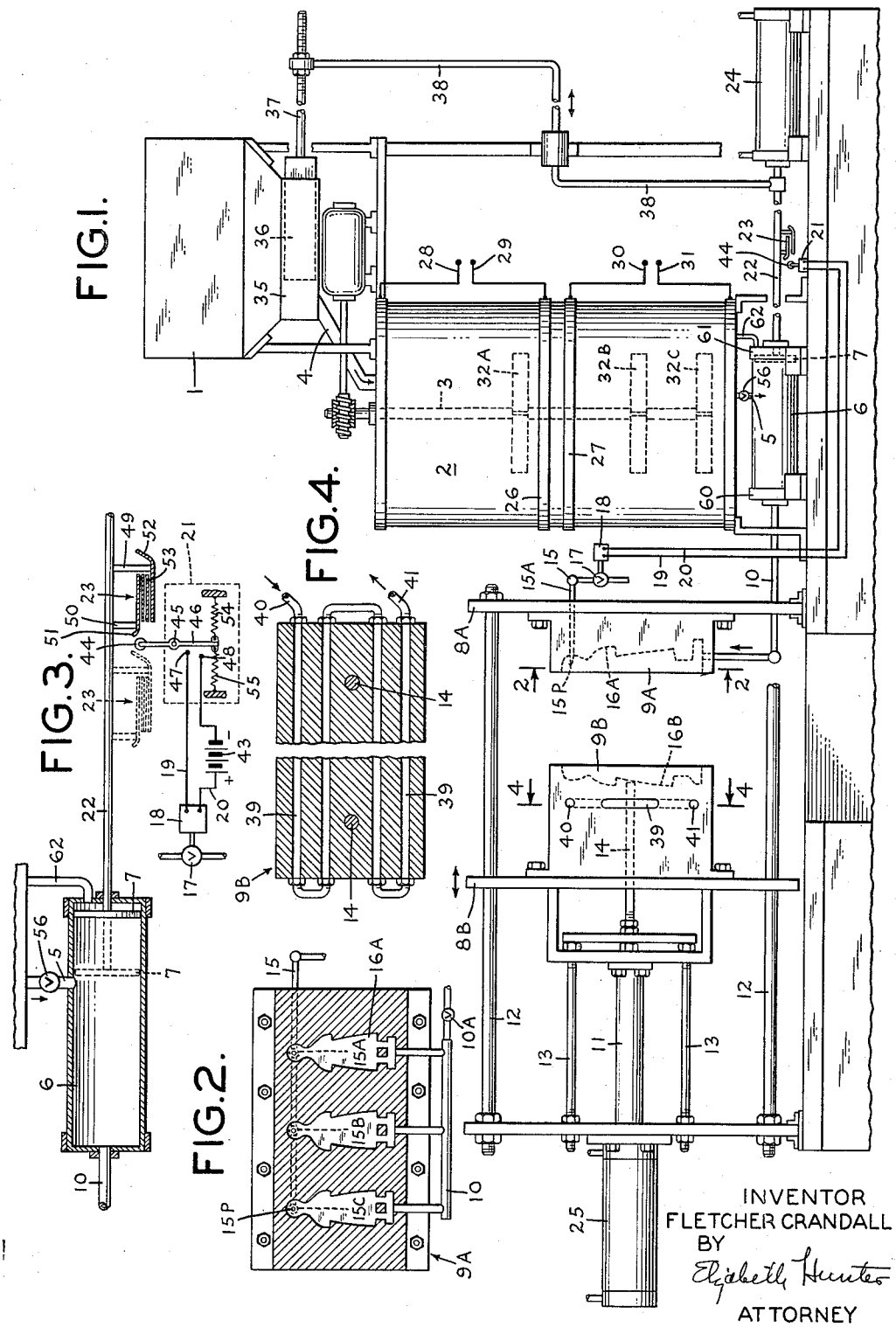
July 11, 1961  F. CRANDALL  2,991,506
APPARATUS FOR LOW PRESSURE MOLDING
Filed June 2, 1958
INVENTOR
FLETCHER CRANDALL
BY
Elizabeth Hunter
ATTORNEY

2,991,506
APPARATUS FOR LOW PRESSURE MOLDING
Fletcher Crandall, Marblehead, Mass., assignor to Allied Chemical Corporation, New York, N.Y., a corporation of New York
Filed June 2, 1958, Ser. No. 739,199
4 Claims. (Cl. 18—30)

This application relates to an apparatus for low pressure injection molding which provides a simple, rapid and economical method for molding hollow articles from low melt viscosity thermoplastic materials.

Low melt viscosity materials such as waxes, etc. have been fabricated in the past by "slush molding" techniques, i.e. by the method of casting, in which the waxy molding material, in liquid form, is poured into a hot mold where a viscous skin forms after cooling. The excess liquid is drained off, usually by inverting the mold, then the mold is further cooled and the molded article is removed.

Slush molding procedures have the advantages of being simple, of making a hollow part in a single piece, and involving little or no finishing expense. This method, therefore, has found wide use in the production of hollow articles, including dolls, and toys of many kinds, collapsible tubes, etc. Slush molding, however, is slow and is usually practiced as a manual operation involving pouring the liquid resin into an upright hot mold, cooling the mold, then inverting it to drain out the excess material followed by cooling the mold.

Injection molding, on the other hand, wherein solid pellets of thermoplastic resins, i.e. molding powders, are plasticized and forced to flow under high pressures and temperatures into a mold, is too expensive and cumbersome for general use in the fabrication of low-cost hollow articles since it requires the use of a core in the mold and the use of pressure resistant cylinder molds and other parts. Injection molding is also slow, being limited by the efficiency of the heating cylinder in warming and plasticizing the molding powder and also by the ability of the mold to cool the material to the point where it is sufficiently strong to resist damage or collapse upon contact with the ejector mechanism. Since plastic materials in general have very low conductiveness, heat transfer in both of the above situations is slow.

An object of my invention is to provide an inexpensive apparatus for rapidly and continuously molding hollow articles using relatively low temperatures and pressures.

A further object of my invention is to provide an apparatus which avoids the disadvantages of both slush molding and injection molding and combines their advantages in the molding of low melt viscosity thermoplastic materials.

In the drawings,
FIGURE 1 is a side elevation of my improved molding machine.
FIGURE 2 is a sectional elevation of the interior of the mold taken along line 2—2 of FIGURE 1.
FIGURE 3 is a detail of one type of switch mechanism for controlling ingress of air into the molds during retraction of the injection cylinder.
FIGURE 4 is a sectional elevation taken through mold 9B along lines 4—4 of FIG. 1 showing temperature control means.

As shown in the drawings, the apparatus includes a hopper 1, mounted above heated mixing tank 2 equipped with stirrer 3, which has one or more paddles 32A, 32B, 32C. Hopper and mixing tank are connected through chamber 35 and chute 4. Pipe 5 connects tank 2 through check valve 56 with heated injection cylinder 6 in which is disposed piston 7 shown in retracted position by dotted lines in FIG. 1, solid lines in FIG. 3. To the faces of platens 8A and 8B are attached half portions 9A and 9B of a hollow mold containing one or more cavities 16A. Both halves of the mold are equipped with conventional cooling devices shown in FIG. 4 as conduit 39 connected by flexible connection 40 to a source of liquid heat transfer medium such as water, not shown, and by flexible connection 41 to an outlet for the heat transfer liquid. Stationary mold 9A is connected to injection cylinder 6 by feed pipe 10, equipped with valve 10A. Movable platen 8B is connected to piston 11 and is equipped to ride on tie rods 12. Stationary ejection rods 13 are connected to knock out bars 14 which extend into the mold cavities when the mold 9B is in retracted position as shown in FIG. 1 of the drawings. Air feed line 15, having a valve 17 and either open to the atmosphere or connected to a source of gas under pressure, not shown, extends through feeder lines 15A, 15B, 15C, etc. into the interior of each mold cavity in the stationary portion 9A of the mold, opposite feed pipe 10, and terminates at a point 15P spaced slightly inwardly from the inside bounding surface of the mold, a distance sufficient to clear the thickness of the plastic wall to be deposited. Valve 17 in air line 15 is connected through solenoid 18 and electrical connections 19, 20 with double pole switch 21 positioned beneath rod 22 which actuates injection piston 7. Tripper 23 depends from rod 22 in a position to actuate switch 21 and to make contact only during the retraction stroke of piston 7 to open valve 17 and maintain it in open position during the entire retraction cycle of the cylinder. Pipe 62 connects the end of cylinder 6 with feed tank 2. Hydraulic cylinders 24 and 25 which connect with pistons 7 and 11 respectively, are connected through conventional control devices and hydraulic pressure system, not shown, to operate mold closure and actuate piston 7 in injection cylinder 6. Valve 10A in feed pipe 10 is connected with means, not shown, coordinated with switch 21, to close the valve when piston 7 is retracted past inlet pipe 5 and open it at the start of a forward stroke.

Heating bands 26 and 27 surrounding mixing tank 2 are connected through wires 28, 29 and 30, 31 respectively to a source of current, not shown, as are heating bands 60 and 61 surrounding injection cylinder 6.

Below hopper 1 within chamber 35 is mounted valve plunger or ram 36, attached to rod 37 extending outwardly of chamber 35. Adjustably mounted on rod 37 is oscillating support 38, the lower extremity of which is fixedly attached to piston rod 22.

In FIGURE 3 switch 21 is illustrated connected to a source of current 43 and to valve 17 by connections 19, 20. Contact member 44 is pivoted at 45. Its lower portion 46 is normally held out of contact with poles 47, 48 by springs 54, 55 which maintain it normally vertical. It is adapted to make contact between poles 47 and 48 when it is pivoted to the left by contact with tripper 23, shown in the form of an "adjustable dog" depending from piston rod 22 and slideably adjustable in length through leaves 51, 52, 53 to coincide with the length of the piston stroke, as by moving supports 49 or 50 or both along piston 22.

In operation, granular plastic material is fed from hopper 1 through chamber 35 and chute 4 into heated mixing tank 2 where it is melted, thoroughly blended and heated to a temperature sufficiently above its melting point to render it fluid. The fluid flows through pipe 5 into injection cylinder 6. The movable platen 8B is advanced towards platen 8A to close the mold 9A—9B, thus acting through the conventional hydraulic control devices to actuate piston 7 after complete mold closure has taken place, forcing liquid plastic through line 10 into mold cavities 16A—16B to completely fill the cavities with liquid. Air which may be in the interior of the molds before injection of plastic escapes through vents appropriately positioned, as is well known. The portion of the plastic in contact with the cavity walls then congeals. After the desired predetermined thickness of plastic has built up on the walls of the mold cavity, piston 7 is retracted, sucking excess liquid out of the mold back into the injection cylinder, air being admitted into the interior of the molded article through feed lines 15A, 15B, 15C by means actuated by the piston to displace the liquid from the mold cavities.

The volume capacity of the injection cylinder will be high enough to carry a volume of liquid thermoplastic material in excess of that required to fill the mold cavities, preferably several times the volume of the molds. Thus when the excess liquid is withdrawn from the mold cavity it will quickly be raised to injection temperature by blending with the liquid in the cylinder whose temperature has been raised sufficiently above the minimum injection temperature by its heating elements 60, 61 during the mold cooling cycle.

When piston 7 is retracted past pipe 5, liquid from tank 2 flows through pipe 5 into cylinder 6 in a quantity sufficient to replace the material which remained in the mold to form the molded objects. Instead of check valve 56, a conventional automatic control device may be provided, arranged to permit flow through pipe 5 only during the portion of the return stroke of piston 7 to the right of pipe 5. The mold is then opened by retraction of the movable platen 8B through operation of the conventional hydraulic system and the molded articles are ejected by the action of knock-out bars. Proper design and venting of the molds, as is well known, may be practiced to insure the desired release of the objects.

On retraction of piston 7, rod 38 attached to piston rod 22 actuates rod 37, which in turn retracts, pulling with it ram 36, thus allowing a predetermined amount of granular thermoplastic material to fall by gravity from hopper 1 into chamber 35. On the forward stroke of piston 7, rod 37 urges ram 36 forward a corresponding length of stroke to feed a predetermined amount of thermoplastic material through chute 4 into melting tank 2 to compensate for the quantity used in forming molded objects 16A, 16B and 16C. Instead of the control arrangement as shown, using rod 38, a minimum level control may be provided in tank 2 to insure periodic replenishment of tank 2 with thermoplastic material.

Operational cycles are controlled by conventional means and include (1) mold closure cycle; (2) an injection cycle during which introduction of plastic is effected; (3) an immobilization or "hold" cycle, during which liquid plastic is held in the mold cavities until the desired portion has solidified; (4) retraction cycle, during which piston 7 retracts, pulling excess liquid behind it, back into the cylinder, and (5) mold opening cycle during which the mold is opened and the molded articles are ejected. The combined cycles are then repeated as often as required until the desired number of articles have been produced. All of the above operations take place continuously according to predetermined time cycles.

Thus after the advance stroke of piston 7 has filled the mold, the piston may be in the position shown in dotted lines in FIGURE 3 of the drawing. Immediately upon the start of the retraction cycle, tripper 23, now in the position shown in dotted lines in FIG. 3, advancing to the right connects with contact member 44, forcing its lower switch portion 46 to close the gap between poles 47 and 48, thus energizing solenoid 18 which opens valve 17 admitting air into the mold cavity 16A. Contact switch member 46 is held across the poles 47, 48 by tripper 23 until completion of the retraction cycle when it again falls free and is pulled out of contact by spring 54 shutting off valve 17. During the next advance of piston 7, the switch is again maintained in open position until the start of another retraction cycle.

As pointed out above, retraction of piston 7 withdraws excess liquid from the mold. The length of stroke of the piston is adjusted to deliver the desired predetermined quantity of liquid to fill the particular molds in use. The length of tripper 23 is adjusted to coincide with the length of the piston stroke and this stroke in turn controls the length of stroke of ram 36 thus controlling the quantity of fresh thermoplastic material which is fed into melting tank from chamber 35. As piston 7 retracts past inlet 5, valve 10A closes, check valve 56 opens, and a quantity of liquid equivalent to the quantity of plastic remaining in the mold flows into the cylinder replenishing its charge. Liquid which may have become trapped behind the piston, is forced back into tank 2 through line 62. Thus the operation proceeds continuously as long as the particular molded object is being produced and the system is always full.

The air in feed line 17 may be held under slight positive pressure sufficient to cause it to flow into the mold cavity 16A, if desired. However, due to the vacuum created by the withdrawal of the liquid, excess pressure on the air feed line will not normally be required. Thus for the air feed normal atmospheric pressures or positive pressures not exceeding about 10 p.s.i.g. will usually be satisfactory. For admitting the air at point 15P a retractable hollow needle may be used as conventional in blow molding operations.

If desired, instead of the contact members shown in the figures, ingress of air into the mold cavities may be controlled by a conventional timer device actuated through a simple tripper system on the piston shaft which, through a microswitch and similar connections, actuates the conventional timer which is set upon a predetermined time cycle coordinated with the machine cycle. Thus the timer would be set so that during the advance of injection piston 7, air valve 17 is held closed and no air is admitted to the mold cavities. Then at the start of the retraction cycle, the timer opens air valve 17, admitting air into the mold cavities 16A. At the close of the retraction cycle the timer closes valve 17, whereupon the system is ready for another cycle.

Because the thermoplastic material in the cylinder is in liquid form, no plug or "pineapple" in the heating cylinder is required and the pressure necessary to force the liquid into the mold is very low, little or no pressure being expended in inducing flow of the plastic as in injection molding. Moreover, little or no cycle time is lost in heat transfer in the cylinder, and only a short "hold" cycle is required in the mold for cooling, since the cool mold rapidly sets the plastic and forms the relatively thin film required. Virtually no waste of material takes place since the reverse piston cycle withdraws excess material back into the cylinder for immediate re-use in the succeeding cycle.

Thus my invention permits important economies in both quantity of plastic material used and in time expended in fabrication.

Operational time cycles will, of course, vary widely depending on the particular shapes being molded, the temperature of the mold, whether cooled, etc., as well as with the nature of the plastic material being used. In all cases, however, operating times are appreciably less than times used in molding by conventional injection molding procedures.

Any suitable, normally solid, thermoplastic organic material or mixture of materials which is fluid below decomposition temperature may be molded in the apparatus of my invention. Such thermoplastics include polyethylenes, nylon, vinyl plastisols, etc. Viscosities customarily used for slush molding are suitable. Such operations are described in Modern Plastics, volume 35, pages 113–114 (May 1958).

Polyethylenes especially suitable for use in my molding apparatus include the normally solid, hard, waxy essentially polyethylenic compounds having average molecular weights in the range between about 1,000 and about 3,000, prepared by subjecting ethylene, either alone or in the presence of a co-reactant to temperatures between about 150° C. and about 300° C. at pressures ranging from about 500 p.s.i.g. to about 7,000 p.s.i.g. If a co-reactant is used, it may be, for example, a normally liquid organic compound free of olefinic saturation, e.g. consisting of carbon, hydrogen and oxygen or carbon, hydrogen and halogen, for example, an alcohol such as isopropanol, an ester, e.g. methyl propionate, a ketone such as acetone, an ether, an alkane, an alkyl benzene, etc. as disclosed, for example, in U.S. Patents 2,683,141 and 2,504,400 of Michael Erchak, Jr.

When ethylene is thus polymerized in the presence of a co-reactant, a "telometer" is formed having a structure which is essentially polyethylenic and containing as a terminal addition to its polyethylene chain, a radical of the co-reactant.

These compounds are solids at normal room temperatures (20°–25° C.) and melt at temperatures from about 90° C. to about 120° C.

Low molecular weight, waxy polyethylenes alone, while suitable for many applications such as hollow novelty animals and other toys, etc., produce objects of somewhat limited structural strength and resistance to cracking. If these polyethylenes are blended with higher molecular weight polyethylenes, for example, those having average molecular weight from about 10,000 to about 30,000 or higher, improved strength and crack resistance are obtained.

Mixtures containing at least 20% low molecular weight polyethylene, i.e. below about 6,000 molecular weight are preferred. Highly satisfactory operation of the apparatus of my invention may be obtained employing blends of about 20% to about 100% of polyethylene wax of average molecular weight between about 1,000 and about 6,000, together with up to about 80% of polyethylenes having average molecular weights in the range between about 10,000 and about 30,000.

Blends may advantageously be prepared by first melting the low molecular weight polyethylene wax, raising its temperature to about 300°–350° F. then adding the high molecular weight material with stirring and maintaining the temperature at about the above level until the polymeric materials have been thoroughly blended.

The temperature of the mold is not critical so long as it is below the melting point of the polyethylene mixture being molded, but not so far below as to cause premature congealing of the mixture before the mold has been completely and uniformly filled. I prefer to maintain the mold at the time of introduction of liquid molding compound at a temperature of at least about 100° F. below the melting point of the mixture being molded, preferably between about 100° F. and about 200° F. below the melting point of such mixture, and may cool the mold to still lower temperatures during the solidification cycle.

Below are given examples of suitable compositions for molding hollow articles according to my process shown together with their viscosity characteristics, in Table I below.

*Table I*

| Formula | Parts | | |
|---|---|---|---|
| | 1 | 2 | 3 |
| Polyethylene Wax, Av. Mol. Wt. 2,000 | 60 | 50 | 40 |
| Polyethylene Plastic, Av. Mol. Wt. 12,000 | 40 | 50 | 60 |
| Suitable operating Temp., ° F | 310 | 310 | 340 |

Operating pressures on the injection cylinder may be extremely low as compared to usual injection molding pressures, and will be only sufficient to drive the fluid plastic into the mold. Suitable pressures will in general be in the range between about 50 p.s.i.g. and about 1,000 p.s.i.g., as compared with injection molding pressures of upwards of about 12,000 p.s.i.g.

While the above describes the preferred embodiments of my invention, it will be understood that departures may be made therefrom within the scope of the specification and claims.

I claim:

1. An injection molding machine assembly comprising a hopper adapted to contain solid granular thermoplastic material, a melting tank arranged to receive solid material from said hopper, means for heating said tank to liquefy the contents thereof, an agitator in said tank, an injection pump outside said tank including a piston and cylinder the inlet of which communicates with a liquid outlet of said tank, means for advancing and retracting said piston thru a predetermined stroke, means controlled by said piston for metering granular material from said hopper into said tank, a first mold block having a face formed with a mold cavity, a second mold block having a face oppositely disposed with respect to the face of said first block, said second block being so constructed and arranged that on contact with said first mold block the respective faces of said blocks form a liquid-tight cavity having a volume capacity substantially less than that of the injection cylinder, means for chilling bounding surfaces of said cavity, means for advancing and retracting at least one of said blocks to close and open said mold cavity ejection means extending into said mold cavity when said mold cavity is open, a liquid duct and a gas duct in said first block, each opening into said cavity, means including said liquid duct for injecting liquid thermoplastic material into said cavity during the course of the advancing stroke of said piston, and means acting during the course of the piston retracting stroke and including said gas duct for injecting gas into said cavity, whereby during the course of said retracting stroke internally disposed uncongealed liquid thermoplastic material is withdrawn from the internal portion of said cavity and is displaced by said gas.

2. An injection molding machine assembly comprising a hopper adapted to contain solid granular thermoplastic material, a melting tank arranged to receive solid material from said hopper, means for heating said tank to liquefy the contents thereof, an agitator in said tank, an injection pump outside said tank including a piston and cylinder the inlet of which communicates with a liquid outlet of said tank, means for advancing and retracting said piston thru a predetermined stroke, means controlled by said piston for metering granular material from said hopper into said tank, a first mold block having a face formed with a mold cavity, a second mold block having a face oppositely disposed with respect to the face of said first block, said second block being to constructed and arranged that on contact with said first mold block the respective faces of said blocks form a liquid-tight cavity having a volume capacity substantially less than that of the injection cylinder, means for chilling bounding surfaces of said cavity, means for advancing and retracting at least one of said blocks to close and open said mold cavity ejection means extending into said mold cavity when said mold cavity is open, a liquid duct and a gas duct in said first block each opening into one portion of said cavity, a gas duct in said first block opening into a substantially diametrically opposed portion of said cavity, means including said liquid duct for injecting liquid thermoplastic material into said cavity during the course of the advancing stroke of said piston, and means acting during the course of the piston retracting stroke and including said gas duct for injecting gas into said cavity whereby during the course of said retracting stroke internally disposed uncongealed liquid thermoplastic material is withdrawn from the internal portion of said cavity and is displaced by said gas.

3. An injection molding machine assembly comprising a hopper adapted to contain solid granular thermoplastic material, a melting tank arranged to receive solid material from said hopper, means for heating said tank to liquefy the contents thereof, an agitator in said tank, an injection pump outside said tank including a piston and cylinder the inlet of which communicates with a liquid outlet of said tank, means for advancing and retracting said piston thru a perdetermined stroke, means controlled by said piston for metering granular material from said hopper into said tank, a fixed mold block having a face forming a mold cavity, a movable mold block having a face oppositely disposed with respect to the face of said fixed block, said movabe block being so constructed and arranged that on contact with said fixed mold block the respective faces of said blocks form a liquid-tight cavity having a volume capacity substantially less than that of the injection cylinder, means for chilling bounding surfaces of said cavity, means for advancing and retracting said moveable block to close and open said mold cavity ejection means extending into said mold cavity when said mold cavity is open, a liquid duct in said first fixed block opening into the bottom of said cavity, a gas duct in said fixed block opening into the top of said cavity, means including said liquid duct for injecting liquid thermoplastic material into said cavity during the course of the advancing stroke of said piston, and means acting during the course of the piston retracting stroke and including said gas duct for injecting gas into said cavity whereby during the course of said retracting stroke internally disposed uncongealed liquid thermoplastic material is withdrawn from the internal portion of said cavity and is displaced by said gas.

4. An injection molding machine assembly comprising an injection pump including a piston and cylinder, means for advancing and retracting said piston thru a predetermined stroke, a mold constructed and arranged to form a liquid-tight cavity having a volume capacity substantially less than that of the injection cylinder, means for chilling bounding surfaces of said cavity, a liquid duct opening into said cavity, and providing a passage from and to said cylinder, an inlet for liquid thermoplastic material into said cylinder, means for advancing said piston to inject said material into said cavity and for retracting said piston to suck uncongealed thermoplastic material from said cavity ejection means extending into said mold cavity when said mold cavity is open, and means coordinated with said piston for admitting gas into said cavity at a point spaced from said chilled bounding surfaces only during retraction of said piston.

References Cited in the file of this patent

UNITED STATES PATENTS

| 1,362,978 | Winter | Dec. 21, 1920 |
| 2,209,877 | Ferngren | July 30, 1940 |
| 2,263,302 | Johnson | Nov. 18, 1941 |
| 2,885,733 | Chupa | May 12, 1959 |

FOREIGN PATENTS

| 567,805 | Great Britain | Mar. 5, 1945 |

OTHER REFERENCES

"How to Slush," Modern Plastics, vol 35, No. 9, page 114, May 1958.